United States Patent [19]

Dew

[11] 4,196,221
[45] Apr. 1, 1980

[54] METHOD AND EQUIPMENT FOR PROCESSING FOOD PRODUCTS

[76] Inventor: Denise R. Dew, 7, rue Paul Barruel, 75015 Paris, France

[21] Appl. No.: 913,146

[22] Filed: Jun. 6, 1978

[30] Foreign Application Priority Data

Jun. 10, 1977 [FR] France ................................ 77 17858
Apr. 12, 1978 [FR] France ................................ 78 10721

[51] Int. Cl.$^2$ .......................................... A22C 21/04
[52] U.S. Cl. .................................... 426/235; 99/451; 99/536; 426/237; 426/246
[58] Field of Search ............... 426/235, 237, 244, 246; 99/451, 535, 536

[56] References Cited

U.S. PATENT DOCUMENTS

| | | | |
|---|---|---|---|
| 2,758,535 | 8/1956 | Roberts | 426/235 X |
| 4,072,762 | 2/1978 | Rhodes | 99/451 X |

*Primary Examiner*—Arthur D. Kellogg
*Attorney, Agent, or Firm*—Pollock, Vande Sande & Priddy

[57] ABSTRACT

A method and equipment for processing food products by spraying with water in an electrical field are provided. The method and equipment are especially suitable for scalding and/or chilling of poultry.

19 Claims, 1 Drawing Figure

U.S. Patent
Apr. 1, 1980
4,196,221
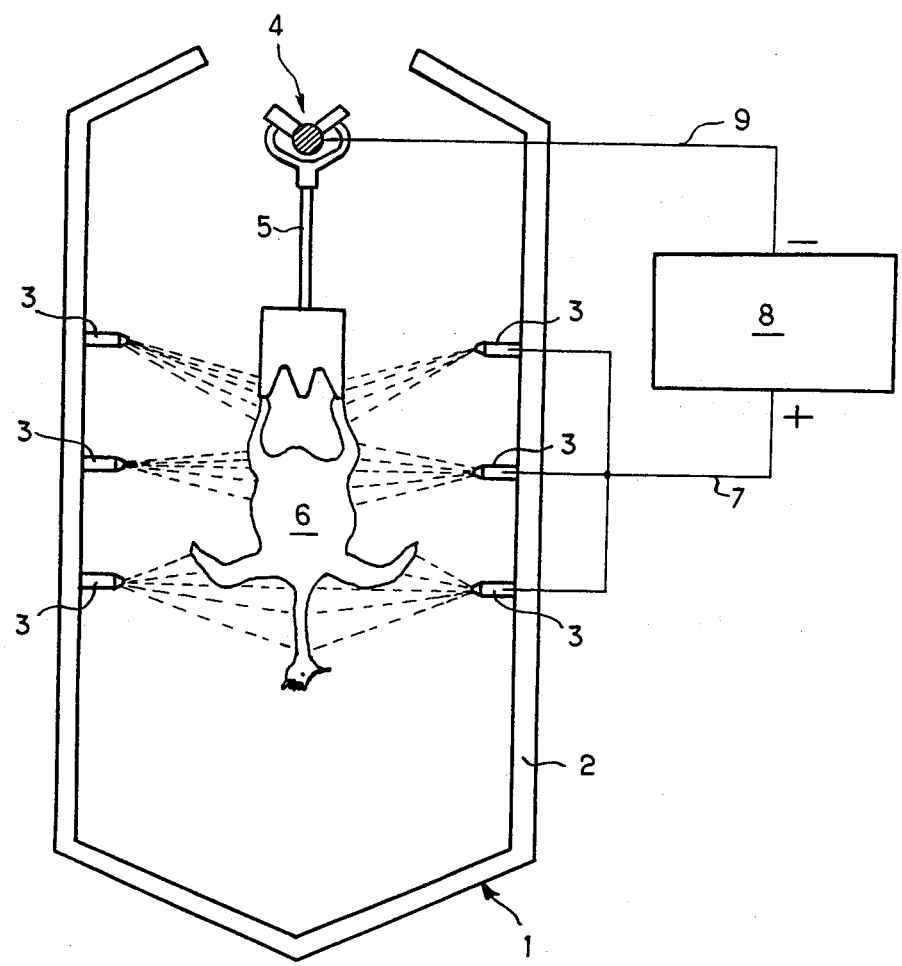

METHOD AND EQUIPMENT FOR PROCESSING FOOD PRODUCTS

BACKGROUND OF THE INVENTION

The present invention is concerned with a method and apparatus for processing food products by spraying with water. In particular, the present invention is concerned with spraying with water in an electrical field.

The processing of food products with water at various temperatures for chilling of the products and/or for scalding is well known. The term "scalding" as used herein refers to the use of hot water to aid in the removal of hair or feathers from a food product. The term "chilling" as used herein refers to heat removal down to a temperature above the freezing point of the moisture contained in the food product and is not intended to include freezing or deep freezing.

For example, in known industrial poultry slaughtering plants, the poultry after the bleeding thereof are carried by a conveyor chain and dipped in a scalding tank and agitated in water at a temperature of about 51° C. in order to facilitate feather removal in the defeathering apparatus. The average duration of such dipping is usually about 2 minutes. However, this method suffers from a serious disadvantage in that the water in the scalding tank is recycled which in turn represents a considerable risk of transferring bacteria from one poultry to another.

In another scalding method used at present, the poultry is hung from a chain and sprayed for about 2 minutes with pressurized water at a temperature of about 51° C. However, this method also suffers from the disadvantage that water is recycled which presents, as discussed hereinabove, contamination risks by transferring bacteria from one poultry to another.

Similarly, poultry chilling, after evisceration by a system referred to as "spin chill" involves dipping poultry for about 30 minutes in a tank containing refrigerated water. This process also suffers from the disadvantage that the water in the tanks is recycled which in turn presents the risk of transferring bacteria. Also, due to the dipping in the tank, the poultry absorbs a certain quantity of water which sometimes implies an increase in weight which is difficult to control in the finished poultry.

An object of the present invention is to provide a method and apparatus for spraying water onto food products wherein the amount of water required is less than that usually needed in various prior processes along with improved heat transfer between the water and food products and/or improved washing of the food products.

A further object of the present invention is to overcome the above-discussed disadvantages of bacteria contamination of known processes.

These objects are achieved by the present invention wherein water is sprayed onto the desired food product through an electric field produced by an electrostatic generator wherein one pole is directly connected to the devices or means for pulverizing or atomizing the water and wherein the other pole is connected to the food product being processed by means of its support member or conveying member.

In addition, the present invention can be used to aid in the partial or complete defeathering of poultry. In particular, the electrostatic polarisation caused by the electrostatic generator can relax the muscles which hold the feathers to the poultry body which in turn facilitates the removal of the feathers.

With respect to defeathering, French patent No. 1,319,462 suggests facilitating the defeathering of poultry hung by their feet to shackles which are connected to an overhead conveyor system, by projecting a mixture of hot water and compressed air onto the poultry. However, this patent does not in any way envisage that the spraying is to be carried out in a field produced by an electrostatic generator.

French patent No. 1,521,982 suggests an apparatus for electrocution of particularly poultry in which a part of the body of the animal is brought into contact with a first electrode connected to a pole of an electric source and another part into contact with a second electrode connected to the second pole of the electric source. At least one of the electrodes is made into a jet of liquid which acts as an electrical conductor being in contact with the corresponding pole and used as an electrode. One of the objects of this device is to anaesthetise the poultry. For such purposes, the projection of the liquid is limited to a clearly defined course that touches only the animal's head, because shocks to other parts of the animal's body while still alive can produce a deterioration of the final presentation to the consumer such as blood spots and the like. This French patent does not disclose washing the animal or effecting heat transfer by employing the apparatus suggested therein.

The sprinkling with water electrically charged on the entire body of poultry, for the purpose of heat exchange and/or washing, is therefore to be avoided in the precise case of an operation purely to anaesthetise an animal to be slaughtered. On the other hand, when the process of the present invention is applied to animals already killed and bled, the amount of water required is reduced while at the same time providing for thorough washing of the animal. Moreover, since the required quantity of water can be reduced in large proportions, it is not normally necessary to recycle the water. Of course, in special cases, it might be desirable to recycle the water which can be carried out in a cycle opposite (countercurrent flow) to that of the movement of the products to be processed during the process.

U.S. Pat. No. 3,918,123 suggests a system of stunning and paralyzing chickens before killing them, by sprinkling first the head and then the feet with an electrolyte, but without risking inhalation of this liquid. The feet of the poultry are then connected to a pole of an electric source and the head is contacted with a support connected to the other pole of this source, of which the nature is not specified. It is absolutely excluded by this patent to spray the whole body of the poultry. Also, the operations mentioned are done before the actual slaughtering.

SUMMARY OF THE INVENTION

The present invention is concerned with a method for processing food products by spraying the food products with water by electrostatic polarization of the water. One pole of the electrostatic generator is connected directly to the means for atomizing the water. The other pole of the generator is connected directly or indirectly to the food product. This other or second pole can be directly connected to the food product through the intermediary of the water. For instance, since water has good electrical conductivity, in the case where the second pole is directly in contact with the water that drains from the product, for example, where the product is carried on a water-saturated belt, the second pole will make contact with the product directly through the water thus producing the polarization effect.

The present invention is also concerned with scalding or chilling or both of a food product such as poultry, for instance, in industrial slaughtering plants wherein the product is sprayed with water at appropriate temperatures. The spraying is done after the bleeding and on substantially the entire body of the product. The spraying is done through an electric field produced by an electrostatic generator. One pole of the generator is directly connected to the means for atomizing the water. The other pole is connected to means for suspending the product such as shackles.

The present invention is also concerned with a process for at least partially defeathering a food product such as poultry for instance in industrial slaughtering plants by projecting at about the same time onto the product both hot water and compressed air through an electric field produced by an electrostatic generator. One pole of the electrostatic generator is connected to the means for atomizing the hot water as well as the means such as jets for projecting the compressed air. The other pole is connected to means for suspending the product such as shackles.

The present invention is also concerned with apparatus or equipment for carrying out the process described hereinabove and includes an electrostatic generator wherein one pole is connected to a material having good electrical conductivity to the atomizing devices. The other pole is connected to a conveyor, and by this intermediary to the products to be sprayed, or directly to these products by the intermediary of the spray water where the particles have been electrically charged, thus achieving the previously-mentioned polarization.

BRIEF DESCRIPTION OF THE DRAWING

The FIGURE is a schematic diagram of one type of arrangement suitable for carrying out the present invention and is a cross-section perpendicular to the direction of the tunnel where scalding and chilling of poultry can be carried out.

DESCRIPTION OF PREFERRED EMBODIMENTS

The present invention is concerned with a method and equipment for processing food products by spraying with water in an electric field. The present invention is particularly suitable for treating meat, fish, poultry, vegetables and fruit. Examples of some suitable vegetables or fruits are peas, carrots, onions, brusselssprouts, green-beans, berries including strawberries, raspberries and the like. The food products to be treated can be packaged or unpacked (e.g., exposed to the atmosphere). For instance, any industrial-type food packaging material can be used in order to minimize the thermal insulation factor, such as, the stretch or vacuum shrink-type for solid products, and of the cup or boxpack type for liquid products. Usually the food products are sprayed in an unpacked condition.

The present invention is most especially suitable for scalding and/or chilling of poultry. Convenient chilling times for instance for poultry are normally from about 30 minutes to about 120 minutes, and for pig carcasses from about 60 minutes to about 320 minutes. The spray-water temperature is desirably as close to 0° C. as is possible for maximum efficiency. Of course, higher temperatures can be used when desired. Moreover, the temperatures of the spray water and atmosphere surrounding the food products are proportionally related to the time required for the chilling. That is, as the time required decreases, so does the required temperatures of the spray water and/or atmosphere for a given desired temperature of the product being treated. With respect to scalding for feather removal, it is preferred to employ temperatures in the range of about 50° to about 55° C. for times in the range of about 1 to about 3 minutes. The amount of time employed for scalding and defeathering is proportionally reduced as the scalding temperature is increased.

In addition, the process of the present invention is intended to be used for spraying water at an appropriate temperature in order to partially or totally thaw a product. A further application of the present invention is to cause by spraying through an electric field a superficial "wetting" or "glazing" of the product to be processed, whether or not they have previously been frozen or deep frozen, in order to improve the conditions of preservation in refrigeration. The improvement is due to the fact that the water coating or the ice-skin thus formed around the products first evaporates due to the conditions of storage but before the products themselves begin to dehydrate under the action of refrigeration. This spraying can be done before the freezing or the deep freezing of the products in order to limit or avoid a dehydration of these products as a result of the said freezing or deep freezing.

The atomization or pulverization of the spray water can be achieved by any type of system suitable for such purposes such as, for example, by centrifugation, by pneumatic action, by gravitation or by the use of ultrasonic vibrations.

In the case of poultry processing, the spraying is done preferably in accordance with directive 71/118/EEC as modified by directive 78/50/EEC dated Dec. 13, 1977, published in the official Journal of the European Communities dated Jan. 19, 1978, disclosures of which are incorporated herein by reference.

Example of known devices suitable for electrostatic projection of atomizable or pulverizable substances can be found in French patent Nos. 1,466,348, 1,523,371, 1,543,568, 1,570,654, 1,578,913, 1,597,330, 1,601,577, 2,025,112, 2,133,502 and 2,215,173, disclosures of which are incorporated herein by reference. Furthermore, with respect to French patent No. 2,133,502, it is noted that such is concerned with a method and apparatus for projection of cryogenic products for the purpose of freezing or deep freezing, by using liquified gases belonging in particular to the group of "high-quality gases" such as carbon dioxide and liquid nitrogen. As discussed hereinabove, the present invention expressly excludes the use of an electrostatic generator for freezing or deep freezing of food products.

Ordinary tap water is quite suitable for carrying out the process of the present invention. The particle size of the atomized water can vary over a large range and is proportionate to the intensity of the voltage of the generator employed. In other words, a higher voltage is used where the particle size is increased. The preferred particle size ranges from about 1 to about 50 microns to provide the greatest efficiencies. However, as indicated above, larger or smaller sizes are quite suitable. If desired, the water employed in the spraying can include one or more additives for treating the food products. For example, the water can include one or more additives to preserve, color, flavor, protect (e.g., antioxidants) or improve (e.g., liquifield smoke for curing hams) the products to be processed by spraying.

Also, if desired, the water can at least be partially recycled in a way that its contamination by bacteria or by other sources coming from the processed products is done following a cycle opposite to that of the movement of the products during this processing.

The products to be sprayed when desired can be carried by conveyors of any type and can be exposed to air and/or in a tunnel.

Examples of suitable means for conveying the food products are belts, chains, links, rails, rollers, trolleys, cross-bars equipped with hanging-hooks, horizontal or sloping assemblies, multiple-layered arms placed one or top of the other, spiral systems, screw-conveyors, systems with trays, palettes or mobile trolleys enabling the changing of the products' position from one place to another, systems of one or more levels, gravity or motor-driven systems, and systems referred to as fluidization systems or fluidized beds with or without conveyor belts.

In the case of equipment to be used for scalding and/or chilling of poultry after the bleeding, the poultry is sprayed with water at an appropriate temperature, for example, inside a tunnel in which moves a conveyor chain from which the poultry are hung. The sprays for the water projection are connected to one pole of an electrostatic generator and the shackles from which are suspended the poultry are connected, for example, by the intermediary of the conveyor chain, to the other pole of the generator.

In apparatus to be used for at least partially defeathering poultry such as in industrial slaughtering plants, the sprays for the projection of water as well as the jets for the substantial simultaneous projection of compressed air are connected to a pole of the electrostatic generator being employed.

For a further understanding of the present invention, reference is made to the FIGURE. The FIGURE is a schematic diagram of equipment particularly suitable for use in the processing of poultry. The FIGURE is a cross-section being perpendicular to the direction of the tunnel where the scalding and the chilling of the poultry is carried out.

Reference to the FIGURE shows a tunnel 1 through which the poultry 6 passes. Tunnel 1 includes vertical walls 2 which include sprays 3 along an appropriate length thereof and at suitable positions.

Sprays 3 are connected by known means to a pressurized water source (not shown) at a desired temperature. A conveyor chain 4, driven by a known means (not shown) carries by use of shackles 5 of the poultry 6 to be processed. Sprays 3 are electrically connected via 7 to the positive contact of electrostatic generator 8.

The negative contact of the electrostatic generator 8 is indirectly electrically connected via 9 to poultry 6 by the intermediary of chain 4 and shackles 5. Generally, the generator employed is a high voltage generator, such as having an output range of up to about 100,000 volts.

Electrostatic polarization can thereby be achieved which improves the heat transfer between the water and the poultry, whether for scalding or chilling. The water particles projected are positively charged and are therefore attracted towards the poultry, which is negatively charged. Improved saturation of the poultry with a reduced water consumption and an improved thermal transfer can be achieved at a reduced cost.

In view of the fact that the quantities of water necessary for scalding or chilling are less than those required by the present methods employed, the recycling of water can be avoided. The amount of water required for the present process as compared to prior art methods is at least about 20% less than prior art methods. This eliminates the problem of bacteriological contamination from one poultry to another. Furthermore, in view of the small quantities of water necessary for the wetting in relation to those required by the present methods, the water after use can economically be purified and then recycled.

Also, if desired, the water can be recycled in a cycle opposite (counter-current flow) to that of the movement of the products processed.

In order to reduce cross-contamination of bacteria from one product to another, the European Economic Community requires that poultry chilling with water that is partially recycled should be done according to a counter-flow process in order that clean water first comes in contact with the products at the final stage of the processing and that the re-cycled water progressively comes in contact with the products following a cycle that is opposite to that of the movement direction of the products. In other words, the water in its most "contaminated" condition only touches the products at the start of the process and the product is gradually washed by "cleaner" water as it moves along until it reaches the final stage of the process where it is only exposed to clean tap water.

It should be noted, however, that as the water saving is substantial with the electrostatic method of the present invention, non-recycled water can be envisaged for most processes.

Moreover, with regard to chilling with electrostatic polarization, since the poultry remains suspended by an overhead conveyor during this operation, the water absorption by the poultry can be rigorously controlled, which is not the case when using the known method referred to as "Spin Chill". In order to achieve at least partially the defeathering of the poultry, jets for the projection of compressed air can be joined to the water sprays 3 shown in the FIGURE.

What is claimed is:

1. Method for processing of food product which comprises directly connecting one pole of an electrostatic generator to means for atomizing water; connecting the other pole of said generator to said food product via means for conveying or suspending said product; and spraying said food product with atomized water from said means for atomizing water by electrostatic polarization of said atomized water.

2. The method of claim 1 wherein said food product is selected from the group consisting of meat, poultry, fish, vegetables, and fruit.

3. The method of claim 1 wherein said treating is scalding or chilling or both of poultry.

4. The method of claim 1 wherein said water includes at least one additive for preserving, coloring, flavoring, protecting, or improving the food product.

5. The method of claim 1 wherein said food product is poultry and said treating is done after bleeding of the poultry and is carried out on substantially the entire body surface of the poultry wherein one pole of an electrostatic generator is directly connected to means for atomizing said water and the other pole is connected to means from which the poultry are suspended.

6. The method of claim 5 wherein said food product is poultry and said process is for causing at least partially the defeathering of said poultry by projecting at about the same time on the poultry hot water and compressed air and wherein the pole of the electrostatic generator connected to the means for atomizing said water is also connected to means for the projection of compressed air.

7. The method of claim 5 wherein the water is at least partially recycled whereby the contamination of the water such as from bacteria from products is carried out in a cycle opposite than that of the product movement during the processing.

8. The method of claim 1 wherein said spraying is used for producing a superficial wetting or glazing of the products being processed for improving the preserving conditions by refrigeration wherein the coating thus formed around the product first evaporates due to the conditions of refrigeration and storage but before the products themselves begin to dehydrate under the conditions of refrigeration.

9. The method of claim 8 wherein the spraying is done before the freezing or deep freezing of the products to be processed in order to at least limit a dehydration of these products from freezing or deep freezing.

10. The method of claim 1 wherein said spraying is employed for thawing at least partially a product by spraying said atomized water at an elevated temperature.

11. Apparatus for spraying food product with water by electrostatic polarization of the water which comprises means for atomizing said water, an electrostatic generator having one pole directly connected to said means for atomizing said water and having its other pole connected to said product via means for conveying or suspending said food product.

12. The apparatus of claim 11 which further includes means for conveying the food product.

13. The apparatus of claim 11 for scalding or chilling or both of poultry which includes a conveyor chain which includes shackles from which poultry can be hung, means for atomizing water on substantially or almost the entire body of the poultry, all of said means for atomizing being directly connected to one pole of said generator, and said shackles are connected to the other pole of said generator via said conveyor chain.

14. The apparatus of claim 13 which further includes jets for projecting compressed air for defeathering of poultry wherein the jets are connected to the same pole as are the means for atomizing said water.

15. The method of claim 1 wherein said treating includes scalding of poultry.

16. The method of claim 15 wherein said scalding is conducted at a temperature of about 50° to about 55° C.

17. The method of claim 1 wherein said treating includes chilling of poultry.

18. The method of claim 1 wherein said food product is meat carcass.

19. The method of claim 1 wherein the particle size of said atomized water is about 1 to about 50 microns.

* * * * *